(12) United States Patent
Huang

(10) Patent No.: US 11,346,319 B2
(45) Date of Patent: May 31, 2022

(54) WAVE ELECTRICITY GENERATOR SYSTEM

(71) Applicant: Kuo-Chang Huang, Tainan (TW)

(72) Inventor: Kuo-Chang Huang, Tainan (TW)

( * ) Notice: Subject to any disclaimer, the term of this patent is extended or adjusted under 35 U.S.C. 154(b) by 0 days.

(21) Appl. No.: 16/550,024

(22) Filed: Aug. 23, 2019

(65) Prior Publication Data

US 2020/0072182 A1 Mar. 5, 2020

(30) Foreign Application Priority Data

Aug. 28, 2018 (TW) ................. 107129967

(51) Int. Cl.
| | |
|---|---|
| *F03B 13/26* | (2006.01) |
| *H02K 7/18* | (2006.01) |
| *B63B 35/44* | (2006.01) |
| *B23C 3/06* | (2006.01) |
| *B63B 59/02* | (2006.01) |
| *B63C 3/06* | (2006.01) |

(52) U.S. Cl.
CPC ............ *F03B 13/262* (2013.01); *B63B 35/44* (2013.01); *B63B 59/02* (2013.01); *B63C 3/06* (2013.01); *H02K 7/1853* (2013.01); *B63B 2035/4466* (2013.01)

(58) Field of Classification Search
CPC ..... F03B 13/262; H02K 7/1853; B63B 59/02; B63B 2035/4466; B63C 3/06
USPC ............. 290/42, 53; 60/506; 440/9; 417/332
See application file for complete search history.

(56) References Cited

U.S. PATENT DOCUMENTS

| | | | | |
|---|---|---|---|---|
| 1,018,678 A | * | 2/1912 | Nelson ................... | F02B 63/04 290/4 D |
| 1,033,476 A | * | 7/1912 | Schulze ................ | F03B 13/187 60/501 |
| 1,066,896 A | * | 7/1913 | Frame .................... | B63H 19/02 440/9 |
| 1,393,472 A | * | 10/1921 | Williams .............. | F03B 13/262 290/42 |
| 3,527,188 A | * | 9/1970 | Shepard ................. | B63H 19/02 440/9 |
| 3,774,048 A | * | 11/1973 | Hardingham ........... | F03B 13/20 290/42 |
| 3,861,487 A | * | 1/1975 | Gill ........................ | B60K 25/10 180/65.31 |
| 3,959,663 A | * | 5/1976 | Rusby ................... | F03B 13/262 290/53 |
| 3,965,365 A | * | 6/1976 | Parr ..................... | F03B 13/1815 290/53 |

(Continued)

*Primary Examiner* — Pedro J Cuevas
(74) *Attorney, Agent, or Firm* — Muncy, Geissler, Olds & Lowe, P.C.

(57) ABSTRACT

A wave electricity generator system includes a water craft, a reinforcement beam mounted to a bottom of the watercraft, a power generating unit and a leverage assembly. The leverage assembly includes a connection unit disposed on the watercraft, and a lever 62 connected to the power generating unit and the connection unit. The connection unit includes a rope retaining seat, a rope and a protective pad. The rope retaining seat is disposed above the watercraft and connected to the lever. The rope is disposed around the watercraft, threads through the reinforcement beam, and is connected to the rope retaining seat. The protective pad is disposed between the reinforcement beam and the rope.

9 Claims, 6 Drawing Sheets

(56) References Cited

U.S. PATENT DOCUMENTS

| | | | | |
|---|---|---|---|---|
| 4,092,828 A * | 6/1978 | Garza | F03B 13/1815 | 417/332 |
| 4,228,360 A * | 10/1980 | Navarro | F03B 13/1885 | 290/43 |
| 4,319,454 A * | 3/1982 | Lucia | F03B 13/1815 | 417/332 |
| 4,371,347 A * | 2/1983 | Jakobsen | B63H 19/02 | 440/9 |
| 4,389,843 A * | 6/1983 | Lamberti | F03B 13/1815 | 290/42 |
| 4,781,023 A * | 11/1988 | Gordon | F03B 13/20 | 60/506 |
| 4,792,290 A * | 12/1988 | Berg | F03B 13/1815 | 417/332 |
| 4,843,249 A * | 6/1989 | Bussiere | F03B 13/183 | 290/42 |
| 4,931,662 A * | 6/1990 | Burton | F03B 13/1815 | 290/42 |
| 5,244,359 A * | 9/1993 | Slonim | F03B 13/1875 | 417/332 |
| 5,789,826 A * | 8/1998 | Kumbatovic | F03B 13/1835 | 290/43 |
| 6,099,368 A * | 8/2000 | Gorshkov | B63H 19/02 | 440/13 |
| 6,647,716 B2 * | 11/2003 | Boyd | F03B 13/1815 | 60/398 |
| 6,814,633 B1 * | 11/2004 | Huang | B63H 19/02 | 440/9 |
| 6,925,800 B2 * | 8/2005 | Hansen | F03B 13/1815 | 60/497 |
| 7,223,137 B1 * | 5/2007 | Sosnowski | B63B 35/44 | 290/54 |
| 8,441,139 B2 * | 5/2013 | Karimi | F03D 9/007 | 290/53 |
| 8,618,686 B2 * | 12/2013 | Jo | F03B 13/20 | 290/53 |
| 8,778,176 B2 * | 7/2014 | Murtha | B01D 24/14 | 210/170.11 |
| 8,784,653 B2 * | 7/2014 | Murtha | B01D 24/042 | 210/170.11 |
| 8,823,196 B1 * | 9/2014 | Gehring | F03B 13/1885 | 290/42 |
| 8,866,321 B2 * | 10/2014 | McCormick | F03B 13/20 | 290/42 |
| 9,334,860 B2 * | 5/2016 | Knowles, Jr. | F04B 5/02 | |
| 9,494,129 B2 * | 11/2016 | Ko | F03B 13/264 | |
| 9,534,579 B2 * | 1/2017 | Van Rompay | F03B 17/063 | |
| 9,587,635 B2 * | 3/2017 | Knowles, Jr. | F04B 9/117 | |
| 9,702,334 B2 * | 7/2017 | Murtha, Jr. | F03B 13/20 | |
| 9,845,800 B2 * | 12/2017 | Knowles, Jr. | F04B 5/02 | |
| 10,029,927 B2 * | 7/2018 | Murtha | B01D 65/02 | |
| 10,030,645 B2 * | 7/2018 | Knowles | F04B 5/02 | |
| 10,227,961 B2 * | 3/2019 | Dragic | F03B 13/187 | |
| 10,359,023 B2 * | 7/2019 | Murtha, Jr. | F03G 7/08 | |
| 10,378,504 B2 * | 8/2019 | Blodgett | H02K 7/1853 | |
| 10,408,187 B2 * | 9/2019 | Duffy | F03B 13/181 | |
| 10,508,640 B2 * | 12/2019 | Murtha, Jr. | F03B 13/16 | |
| 2008/0122225 A1 * | 5/2008 | Smith | F03B 13/1815 | 290/42 |
| 2011/0042954 A1 * | 2/2011 | Werjefelt | F03B 13/20 | 290/53 |
| 2011/0068579 A1 * | 3/2011 | Dullaway | F03B 13/20 | 290/53 |
| 2011/0101697 A1 * | 5/2011 | Power, III | F03B 17/061 | 290/54 |
| 2012/0001431 A1 * | 1/2012 | Smith | F03B 13/1815 | 290/53 |
| 2016/0319798 A1 * | 11/2016 | Blodgett | H02K 7/1853 | |
| 2019/0323477 A1 * | 10/2019 | Blodgett | H02K 7/1853 | |

* cited by examiner

WAVE ELECTRICITY GENERATOR SYSTEM

CROSS-REFERENCE TO RELATED APPLICATION

This application claims priority to Taiwanese Patent Application No. 107129967, filed on Aug. 28, 2018.

FIELD

The disclosure relates to a hydroelectric generation system, and more particularly to a wave electricity generator system.

BACKGROUND

FIGS. 1 and 2 illustrate a wave electricity generation system, disclosed in Taiwanese Patent Publication No. 201704633. The wave electricity generation system is disposed between a shore and a water area proximate to the shore, and includes a leverage unit 11 disposed on the shore, a hydraulic device 12 disposed on the shore in proximity to the leverage unit 11 and pivotally connected to an end of the leverage unit 11, a floating block 13 floating on the water area and pivotally connected to the other end of the leverage unit 11, a lift device 14 disposed on the shore in proximity to the hydraulic device 12 and drivenly connected to the hydraulic device 12, a power generator device 15 disposed on the shore in proximity to the lift device 14, and a moving medium 16 movable between the lift device 14 and the power generator device 15.

When the floating block 13 is moved upward by waves and drives pivotal rotation of the leverage unit 11, the hydraulic device 12 is pressed and drives the lift device 14 to lift the moving medium 16 toward and above the power generator device 15. Due to gravity effects, the moving medium 16 drives the power generator device 15 for electricity generation. When the floating block 13 moves downwardly and does not press the hydraulic device 12, the moving medium 16 moves downwardly toward the lift device 14 for the next cycle of electricity generation.

Because the wave electricity generation system is structurally complicated, not only is the cost of electricity generation high, but assembly or maintenance of the system is also difficult. In addition, since the size of the floating block 13 is small, the efficiency of electricity generation is relatively low. If a floating block for high power generating efficiency is to be fabricated, fabrication costs will increase.

SUMMARY

Therefore, an object of the present disclosure is to provide a wave electricity generator system that can alleviate at least one of drawbacks of the prior art.

Accordingly, a wave electricity generator system of this disclosure includes a buoyant unit and at least one power generation system.

The buoyant unit includes a watercraft and a reinforcement beam that extends lengthwise of the watercraft and that is disposed at a bottom of the watercraft. The watercraft is configured to float on a water area proximate to a shore. The at least one power generation system includes a power generating unit and a leverage assembly. The power generating unit is configured to be disposed on the shore. The leverage assembly includes a lever seat to be mounted on the shore, a connection unit disposed on the watercraft, and a lever pivotally mounted to the lever seat and having two opposite ends respectively and pivotally connected to the power generating unit and the connection unit. The connection unit includes a rope retaining seat, a rope and a protective pad. The rope retaining seat is disposed above the watercraft and pivotally connected to the lever. The rope is disposed around the watercraft, threads through the reinforcement beam, and has two opposite ends respectively connected to two opposite ends of the rope retaining seat. The protective pad is disposed between the reinforcement beam and the rope.

The lever is moved by up and down motions of the watercraft to drive rotation of the power generating unit for electricity generation.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
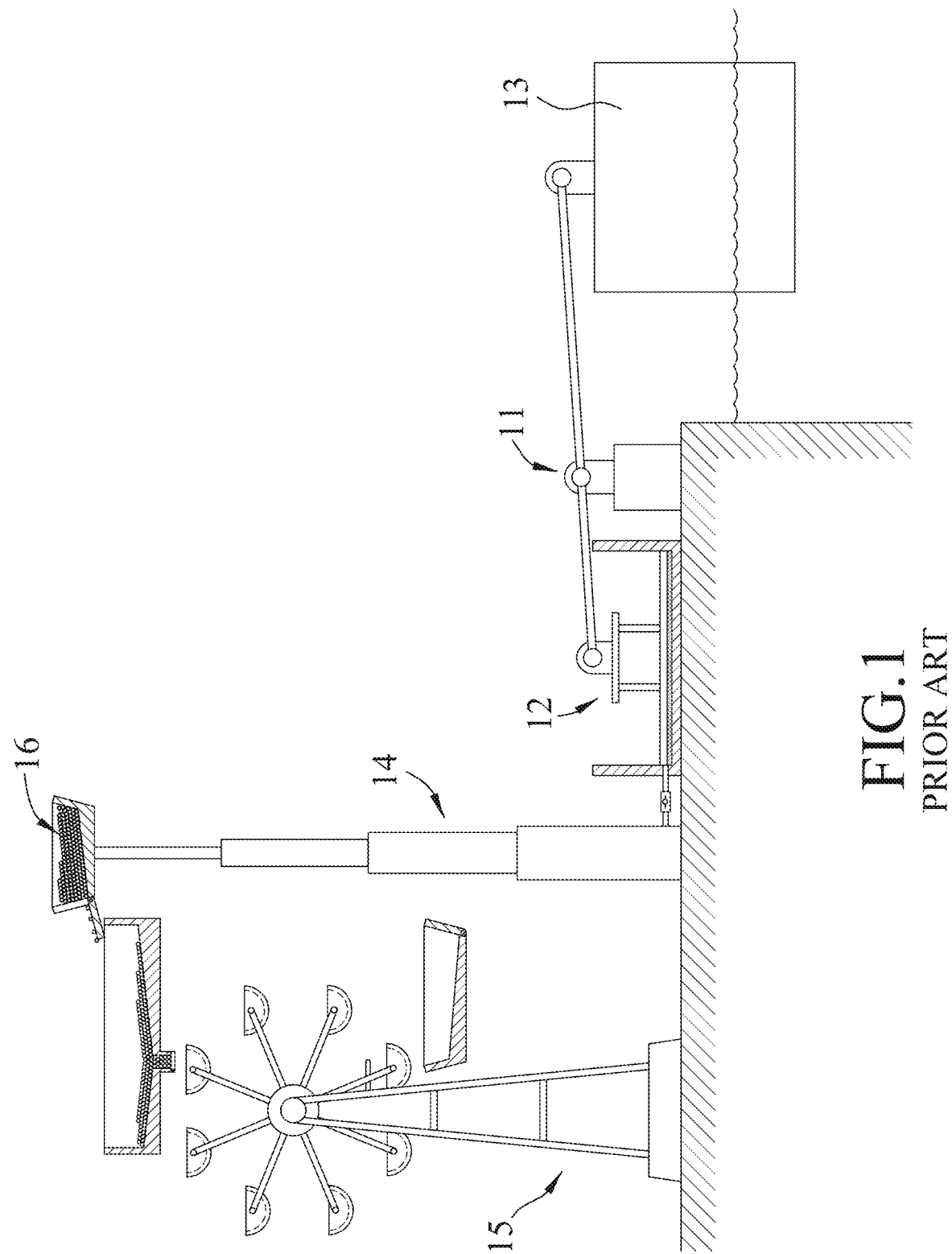
FIG. 1 is a side view of an existing wave electricity generator system.
Figure 2:
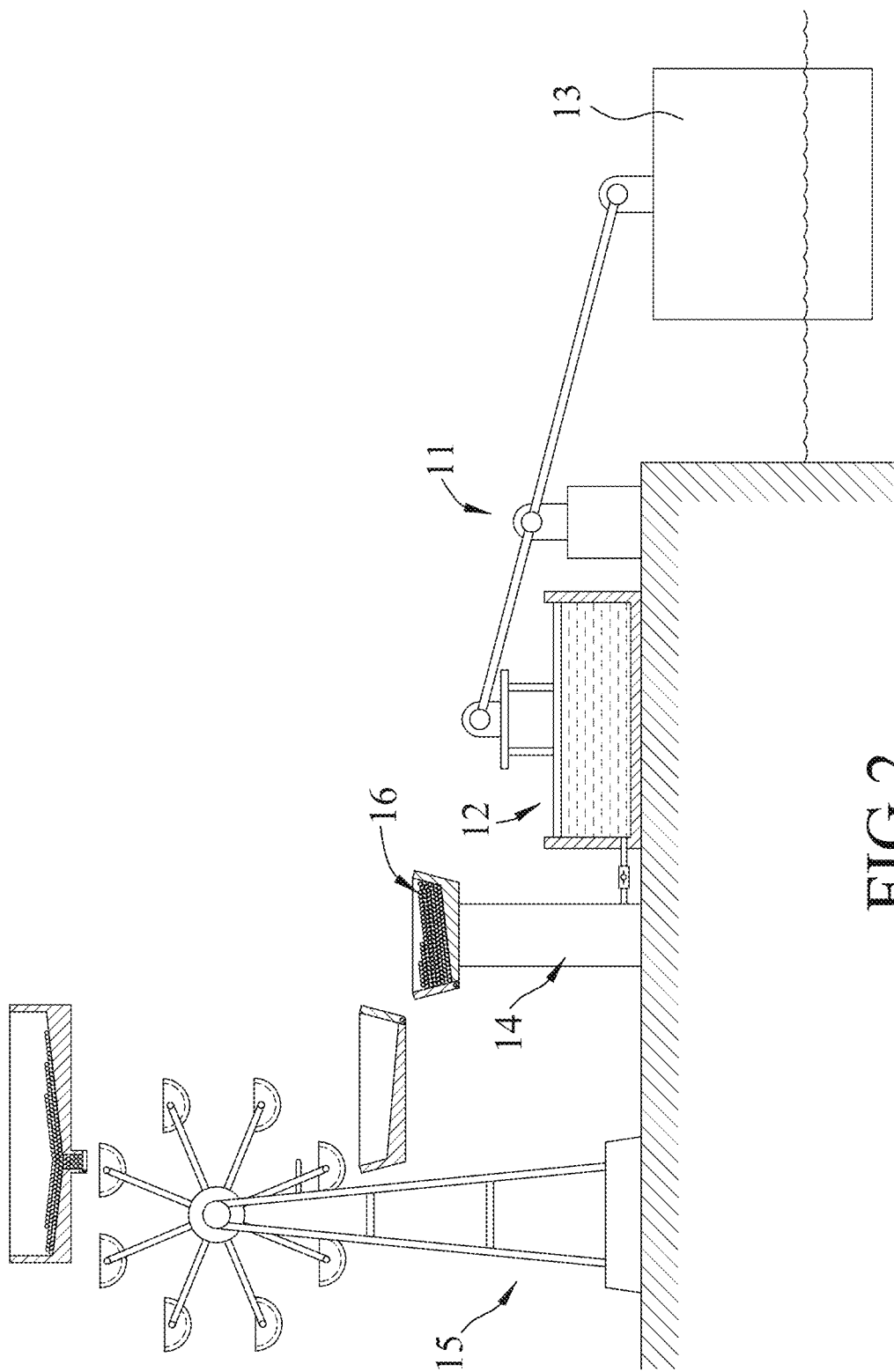
FIG. 2 is similar to FIG. 1, but illustrates the existing wave electricity generator system in a different operating state.
Figure 3:
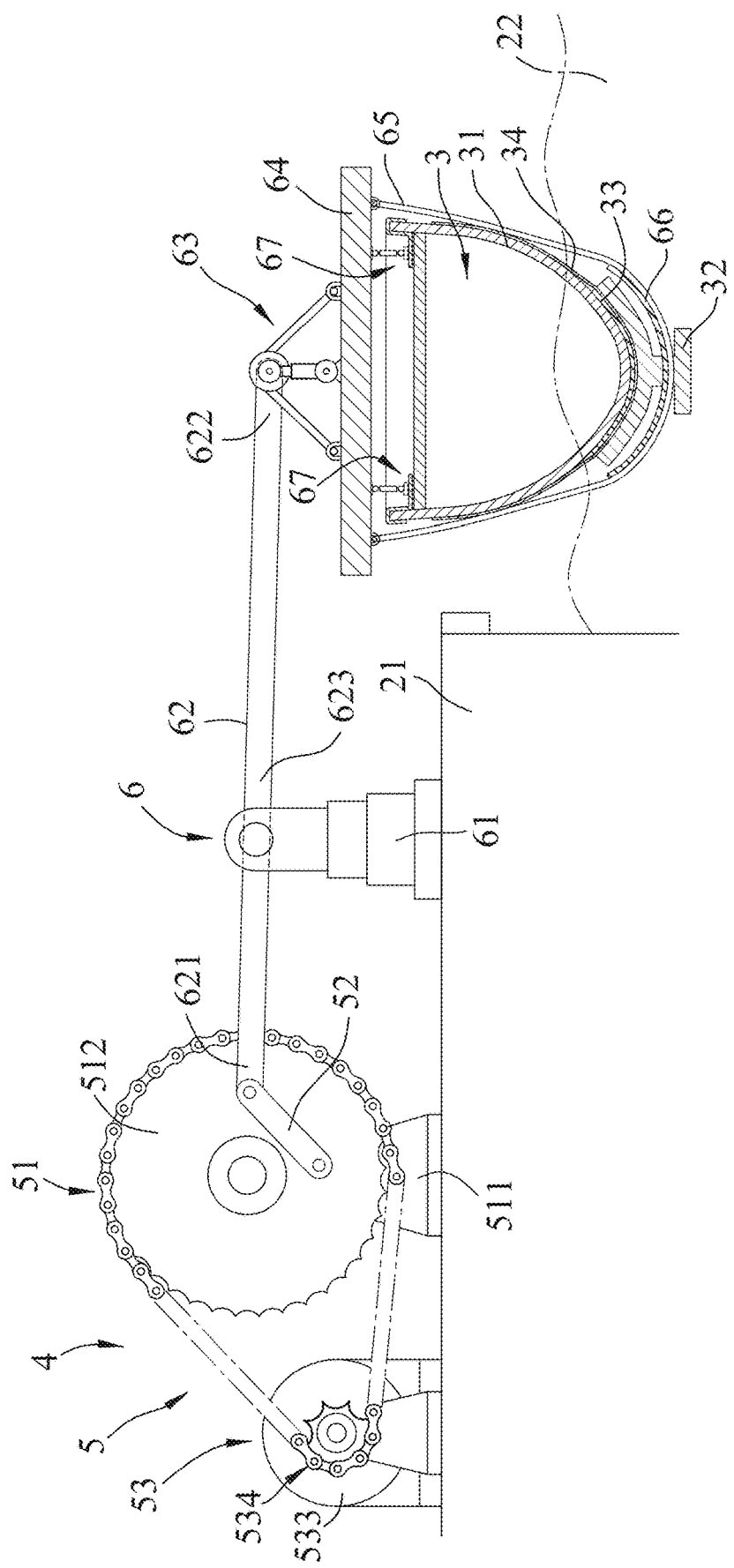
FIG. 3 is a side view of an embodiment of a wave electricity generator system according to the disclosure.
Figure 4:
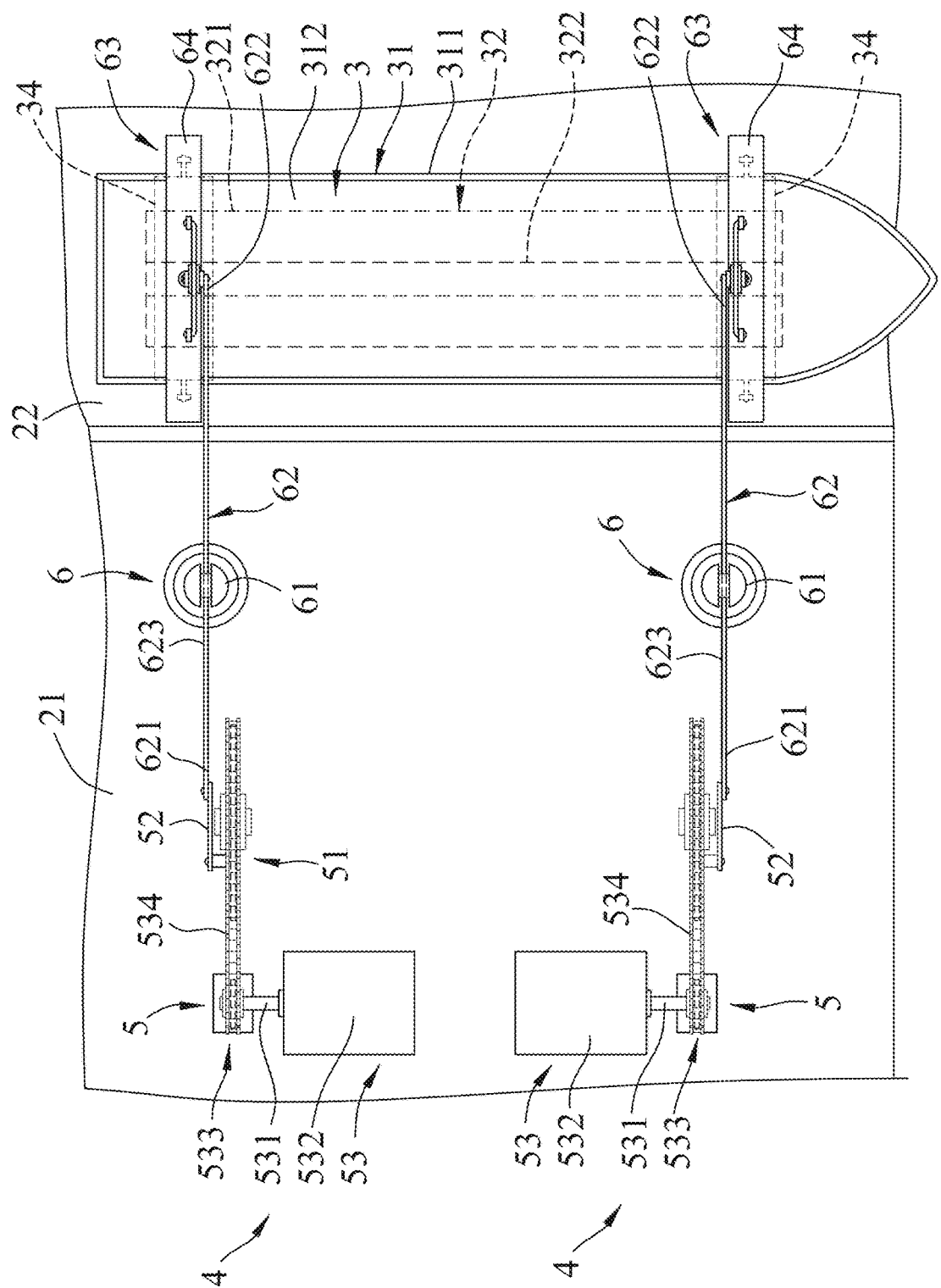
FIG. 4 is a top view of the embodiment.
Figure 5:
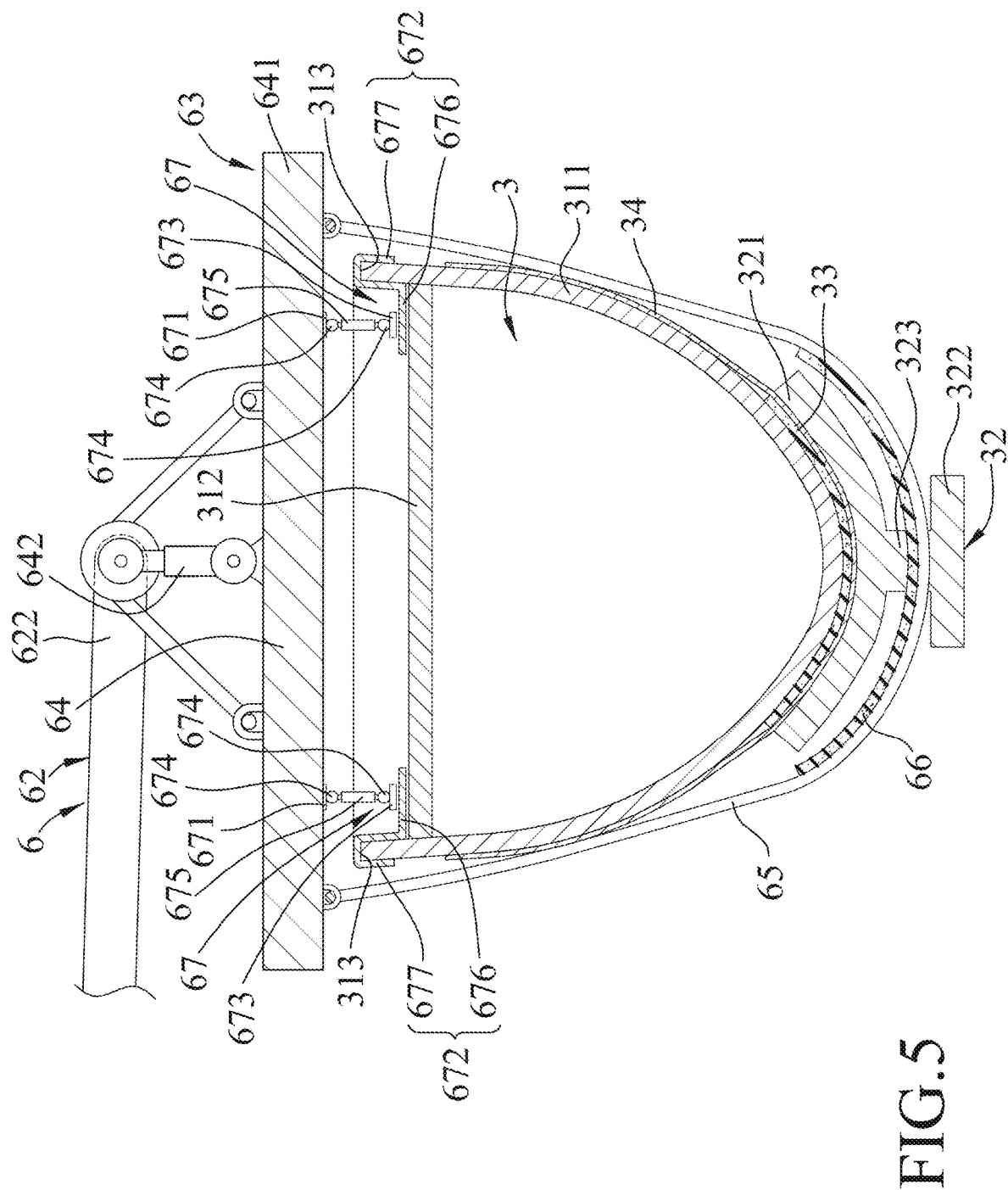
FIG. 5 is a fragmentary sectional view illustrating a buoyant unit of the wave electricity generator system.

Referring to FIGS. 3 to 5, a wave electricity generator system according to an embodiment of the present disclosure is suitable for being placed between a shore 21 and a water area 22 proximate to the shore 21.

The wave electricity generator system of this disclosure includes a buoyant unit 3 and a plurality of power generation systems 4.

The buoyant unit 3 includes a watercraft 31, a reinforcement beam 32, a reinforcement pad 33 and two steel plates 34.

The watercraft 31 is a used boat, but is not limited thereto. The watercraft 31 floats on the water area 22, and has a main body 311 having a U-shaped cross section, and a deck 312 mounted on the main body 311. The main body 311 has two spaced-apart top edges 313 each of which is higher than the deck 312 and extends along a lengthwise direction of the watercraft 31.

The reinforcement beam 32 extends lengthwise of the watercraft 31, is disposed at a bottom of the watercraft 31, and has a substantially I-shaped cross section. In this embodiment, the reinforcement beam 32 has a bent portion 321 lying beneath and complementing a curvature of the bottom of the watercraft 31, a flat portion 322 spaced apart from and disposed below the bent portion 321, and an intermediate portion 323 connected between the bent portion 321 and the flat portion 322.

The two steel plates 34 are disposed between the reinforcement beam 32 and the watercraft 31 and are spaced apart along the lengthwise direction of the watercraft 31. The reinforcement pad 33 is disposed between the reinforcement beam 32 and the bottom of the watercraft 31. The reinforcement pad 33 extends along the lengthwise direction of the watercraft 31, and has a width to fit a width of the bent portion 321 of the reinforcement beam 32. Each steel plate 34 extends over an outer surface of the reinforcement pad 33.

In this embodiment, the number of the power generation systems 4 is two. The power generation systems 4 are respectively connected to the bow and the stern of the watercraft 31. In other embodiments, only one power generation system 4 is connected to a middle of the watercraft 31, or more than two power generation systems 4 are connected to the watercraft 31 and are spaced apart from each other along a line parallel to the lengthwise direction of the watercraft 31.

Each power generation system 4 includes a power generating unit 5 disposed on the shore 21, and a leverage assembly 6 connected between the power generating unit 5 and the watercraft 31.

The power generating unit 5 includes a rotary wheel assembly 51 mounted on the shore 21, a crank 52 pivotally connected to the rotary wheel assembly 51, and a power generator 53 drivenly connected to the rotary wheel assembly 51.

The rotary wheel assembly 51 includes a wheel seat 511 disposed on the shore 21 between the power generator 53 and the leverage assembly 6, and a wheel 512 rotatably mounted to the wheel seat 511. The crank 52 has two opposite ends respectively and pivotally connected to the wheel 512 and the leverage assembly 6. The power generator 53 includes a power generating device 532 disposed on the shore 21 and having a rotor 531, a transmission wheel set 533 driving rotation of the rotor 531 and smaller in outside diameter than the wheel 512, and a chain 534 connected between the transmission wheel set 533 and the wheel 512 for transmitting motions from the wheel 512 to the transmission wheel set 533.

The leverage assembly 6 includes a lever seat 61 mounted on the shore 21 between the rotary wheel assembly 51 and the watercraft 31, a lever 62 pivotally mounted to the lever seat 61, and a connection unit 63 disposed on the watercraft 31.

The lever seat 61 can be telescopically lengthened or shortened in a top-bottom direction to elevate or lower the lever 62 for enhancement of power generation effect during tidal changes.

To accommodate tidal differences, the lever 62 is made to be deformable and resilient. The lever 62 has a first end 621, a second end 622 opposite to the first end 621, and an intermediate portion 623 disposed between the first and second ends 621, 622 and pivotally mounted to the lever seat 61. The first end 621 is pivotally connected to the crank 52, and the second end 622 is pivotally connected to the connection unit 63.

The connection unit 63 includes a rope retaining seat 64, a rope 65, a protective pad 66 and two damper sets 67. The rope retaining seat 64 is disposed above the watercraft 31 and pivotally connected to the second end 622 of the lever 62. The rope 65 is disposed around the watercraft 31, threads through the intermediate portion 323 of the reinforcement beam 32, and has two opposite ends respectively connected to two opposite ends of the rope retaining seat 64. The protective pad 66 is disposed between the reinforcement beam 32 and the rope 65. The damper sets 67 are spaced apart from each other along a width direction of the watercraft 31 and disposed between the deck 312 and the rope retaining seat 64. In this embodiment, the rope retaining seat 64 has a transverse bar 641 that extends along the width direction of the watercraft 31 and that is supported by the damper sets 67 to be spaced apart from the deck 312, and a connection rod 642 that extends upwardly from the transverse bar 641 and that is pivotally connected to the second end 622 of the lever 62.

Each damper set 67 has a fixing plate 671 fixed on the transverse bar 641 of the rope retaining seat 64, a linking plate 672 mounted on the watercraft 31, a spacer plate 673 disposed between the fixing plate 671 and the linking plate 672, two universal ball joints 674 respectively connected to the fixing plate 671 and the spacer plate 673, and a damper 675 connected between the universal ball joints 674. The linking plate 672 has a first plate portion 676 and a second plate portion 677 bending from the first plate portion 676. The first plate portion 676 is spaced apart from the deck 312. The second plate portion 677 has an inverted U-shaped cross section and straddles one of the top edges 313 of the watercraft 31.

Figure 6:
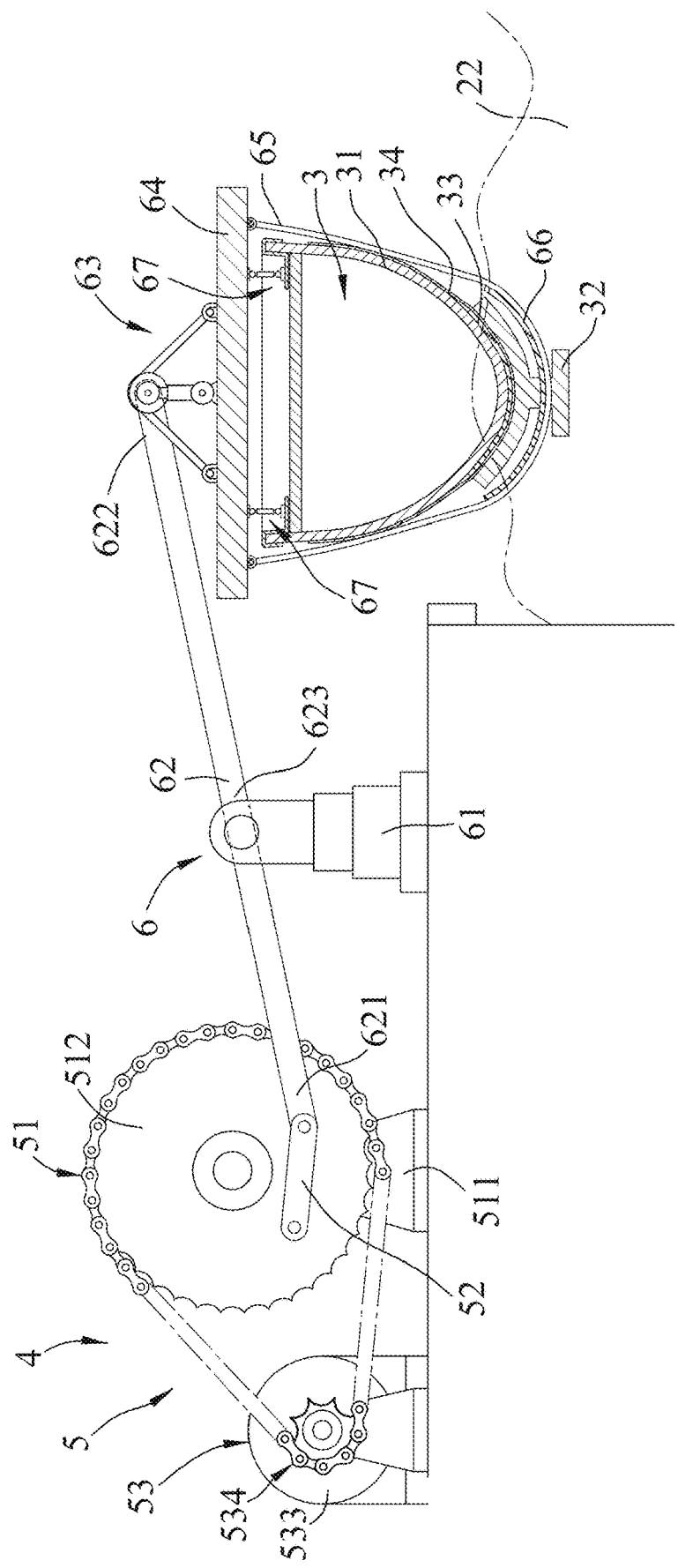
FIG. 6 is similar to FIG. 3, but illustrating the buoyant unit at a high position.

As shown in FIGS. 3, 5 and 6, the watercraft 31 floats in up and down motions on the water area 22 between a low position (see FIG. 3) and a high position (see FIG. 6).

When the watercraft 31 is at the low position, the second end 622 of the lever 62 is moved downwardly by the watercraft 31 and lower than the first end 621 of the lever 62.

When waves in the water area 22 cause the watercraft 31 to rise to the high position, the deck 312 first pushes the damper sets 67, and the damper sets 67 push the rope retaining seat 64 to move upwardly the second end 622 of the lever 62, such that the second end 622 of the lever 62 is higher than the first end 621 of the lever 62.

Because the watercraft 31 is pushed by water waves on the water area 22, the second end 622 of the lever 62 is moved up and down and the lever 62 is pivotally rotated about a fulcrum point of the intermediate portion 623 of the lever 62. The first end 621 of the lever 62 therefore drives the crank 52 to rotate the wheel 512, and the transmission wheel set 533 is driven by the rotation of the wheel 512 for electricity generation.

The reinforcement beam 32 is used for the purpose of protecting and preventing the watercraft 31 from breaking due to the attack of successive sea waves. The reinforcement pad 33 functions to provide a buffering effect between the reinforcement beam 32 and the watercraft 31 both of which are rigid. Each steel plate 34 protects and prevents the main body 311 of watercraft 31 from being abraded by the rope 65 and becoming indented. Each steel plate 34 along the lengthwise direction of the watercraft 31 has a width of 3 to 8 times greater than a width of the rope 65. The damper sets 67 provide the effect of damping the watercraft 31 when the watercraft 31 swings and hence stabilize smooth operation of the watercraft 31.

In other embodiments of the wave electricity generator system of this disclosure, there are a plurality of buoyant units 3 each of which cooperates with one power generation systems 4, or multiple power generation systems 4.

To sum up, the effects of the wave electricity generator system of this disclosure are as follows. Because the used watercraft 31 is employed instead of a floating block used in the prior art, the wave electricity generator system of the disclosure is economically beneficial for power generation. Because the reinforcement beam 32 and the protective pad 66 enhance the strength of the watercraft 31, the water craft 31 can withstand the attack of sea waves and are capable of replacing the prior floating block.

While the disclosure has been described in connection with what is considered the exemplary embodiments it is understood that this disclosure is not limited to the disclosed embodiment but is intended to cover various arrangements included within the spirit and scope of the broadest interpretation so as to encompass all such modifications and equivalent arrangements.

What is claimed is:

1. A wave electricity generator system, comprising:
a buoyant unit including a watercraft and a reinforcement beam that extends lengthwise of said watercraft and that is disposed at a bottom of said watercraft, said watercraft being configured to float on a water area proximate to a shore; and
at least one power generation system including a power generating unit and a leverage assembly, said power generating unit being configured to be disposed on the shore, said leverage assembly including a lever seat to be mounted on the shore, a connection unit disposed on said watercraft, and a lever pivotally mounted to said lever seat and having two opposite ends respectively and pivotally connected to said power generating unit and said connection unit, said connection unit including a rope retaining seat, a rope and a protective pad, said rope retaining seat being disposed above said watercraft and pivotally connected to said lever, said rope being disposed around said watercraft, threading through said reinforcement beam, and having two opposite ends respectively connected to two opposite ends of said rope retaining seat, said protective pad being disposed between said reinforcement beam and said rope, said lever being moved by up and down motions of said watercraft to drive rotation of said power generating unit for electricity generation.

2. The wave electricity generator system as claimed in claim 1, wherein said buoyant unit further includes at least one steel plate disposed between said reinforcement beam and said watercraft.

3. The wave electricity generator system as claimed in claim 2, wherein said buoyant unit further includes a reinforcement pad disposed between said reinforcement beam and said watercraft.

4. The wave electricity generator system as claimed in claim 1, wherein said reinforcement beam has a bent portion lying beneath and complementing a curvature of said bottom of said watercraft, a flat portion spaced apart from and disposed below said bent portion, and an intermediate portion connected between said bent portion and said flat portion.

5. The wave electricity generator system as claimed in claim 1, wherein said connection unit further includes at least one damper set disposed between said watercraft and said rope retaining seat to provide a damping effect between said watercraft and said rope retaining seat.

6. The wave electricity generator system as claimed in claim 1, wherein said connection unit further includes at least one damper set that has a fixing plate fixed on said rope retaining seat, a linking plate mounted on said watercraft, a spacer plate disposed between said fixing plate and said linking plate, two universal ball joints respectively connected to said fixing plate and said spacer plate, and a damper connected between said universal ball joints.

7. The wave electricity generator system as claimed in claim 6, wherein said linking plate has a first plate portion and a second plate portion bending from said first plate portion, said second plate portion having an inverted U-shaped cross section and straddling a top edge of said watercraft.

8. The wave electricity generator system as claimed in claim 1, wherein said at least one power generation system includes a plurality of power generation systems spaced apart from each other along a line parallel to a lengthwise direction of said watercraft.

9. The wave electricity generator system as claimed in claim 1, wherein said power generating unit includes a rotary wheel assembly to be mounted on the shore, a crank pivotally connected to said rotary wheel assembly and said lever, and a power generator drivenly connected to said rotary wheel assembly.

* * * * *